| United States Patent [19] | [11] Patent Number: 4,885,366 |
|---|---|
| Gunther et al. | [45] Date of Patent: Dec. 5, 1989 |

[54] NOVEL SELENIUM-CONTAINING MEROCYANINE DYES

[75] Inventors: Wolfgang H. H. Gunther, West Chester, Pa.; Frederick J. Sauter, Rochester, N.Y.

[73] Assignee: Eastman Kodak Company, Rochester, N.Y.

[21] Appl. No.: 203,843

[22] Filed: Jun. 8, 1988

[51] Int. Cl.$^4$ ............................................. C07D 421/06
[52] U.S. Cl. ..................................... 544/300; 544/306
[58] Field of Search .............................. 544/306, 300

[56] References Cited

U.S. PATENT DOCUMENTS

| 3,854,956 | 12/1974 | Lincoln | 548/121 |
|---|---|---|---|
| 3,933,507 | 1/1976 | von Konig et al. | 548/121 |
| 4,028,353 | 6/1977 | Borror | 548/121 |
| 4,473,652 | 9/1984 | Okazaki et al. | 436/536 |
| 4,524,128 | 6/1985 | Edwards et al. | 430/353 |
| 4,651,739 | 3/1987 | Oseroff et al. | 128/395 |
| 4,770,961 | 9/1988 | Tanaka et al. | 548/121 |
| 4,775,625 | 10/1988 | Sieber | 514/274 |

FOREIGN PATENT DOCUMENTS

| 405309 | 1/1934 | United Kingdom | 548/121 |
|---|---|---|---|
| 646900 | 11/1950 | United Kingdom | 548/121 |

OTHER PUBLICATIONS

Loew et al, Biochemistry, vol. 17, No. 19, 1978 p. 4065 "Change Shift Optical Probes of Membrane Potential, Theory".

Cohen et al, J. Membr. Biol. 19, 1–36 (1974) "Changes in Axon Fluorescence during Activity: Molecular Probes of Membrane Potential".

Lawrence Kass, "Identification of Normal and Leukemic Granulocytic Cells with Merocyanine 540", *Stain Technology*, vol. 61, No. 1, 1986.

B. Kalyanaraman et al, "Photodynamic Action of Merocyanine 540 on Artificial and Natural Cell Membranes: Involvement of singlet Molecular Oxygen", *Proc. Natl., Acad. Sci.*, vol. 84, pp. 2999–3003, May 1987.

F. Sieber et al, "Dye-Mediated Photolysis of Human Neuoblastoma Cells: Implications for Autologous Bone Marrow Transplantation", *Blood*, vol. 68, No. 1, pp. 32–36, Jul. 1986.

F. Sieber et al, "Dye-Mediated Photosensitization of Murine Neuroblastoma Cells," *Cancer Research*, vol. 46, pp. 2072–2076, Apr. 1986.

F. Sieber et al, "Dye-Mediated Photolysis of Normal and Neoplastic Hematopoietic Cells," *Leukemia Research*, vol. 11, No. 1, pp. 43–49, 1987.

*Primary Examiner*—Mukund J. Shah
*Assistant Examiner*—Cecilia Shen
*Attorney, Agent, or Firm*—Arthur H. Rosenstein

[57] ABSTRACT

A merocyanine dye having the formula:

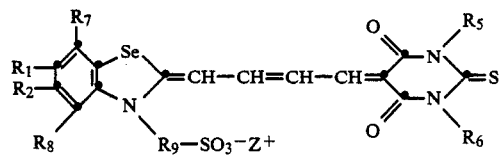

wherein:

$R_1$ and $R_2$ independently are H, alkyl, alkoxy or aryl, $R_7$ and $R_8$ are H or any of $R_1$ and $R_2$, $R_1$ and $R_7$, $R_2$ and $R_8$ can together comprise the atoms necessary to form a fused aromatic ring on the benzene radical to which they are attached;

$R_5$ and $R_6$ comprise alkyl of from 1–18 carbon atoms provided that the sum of the carbon atoms in $R_5$ and $R_6$ is at least 8;

$R_9$ is an alkylene group of 2–9 nuclear carbon and hetero atoms; and $Z^+$ is a cation.

This dye is useful in a method for inactivating viruses comprising contacting the viruses with the compound and exposing the resulting mixture to visible light to excite and inactivate the viruses. The compounds are also useful in the irradiation-induced inactivation of leukemia cells.

6 Claims, No Drawings

NOVEL SELENIUM-CONTAINING MEROCYANINE DYES

BACKGROUND OF THE INVENTION

Viruses can cause human or animal diseases. The inability to effectively inactivate pathogenic viruses without adversely affecting their antigenic properties has made it difficult to make safe, effective vaccines for viral diseases. In addition, the presence of viruses can destroy the utility of valuable food and industrial products.

Heat treatments, the extraction of virus with solvents and detergents, and the treatment with high doses of gamma radiation can be effective means of inactivating viruses. However, those procedures are rigorous and nonspecific and their applicability is limited. As a result, there is a need for a simple, effective method for inactivating viruses.

In U.S. Pat. No. 4,775,625, by Dr. F. Sieber, it is disclosed that a merocyanine dye MC540 and the novel merocyanine dyes of the instant invention, which were received by Dr. Sieber from the present inventor, are useful as agents which preferentially bind to the lipids in enveloped viruses or virus-infected cells and which do not or bind only minimally to the other components of the cells to inactivate the viruses and virus-infected cells. The MC540 dye and its use in eliminating tumor cells from bone marrow grafts is described in "Elimination of Residual Tumor Cells from Autologous Bone Marrow Grafts by Dye-Mediated Photolysis: Preclinical Data", by Dr. Fritz Sieber in *Photochemistry and Photobiology*, Vol. 46, No. 1, pages 71-76, (1987).

There is a need for effective compounds suitable for use with photosensitization for inactivating viruses and for removing tumor cells.

BRIEF SUMMARY OF THE INVENTION

It has been discovered that novel merocyanine dyes can be brought into contact with an effective amount of a photosensitizing agent and exposed to visible light until the viruses and virus-infected cells have been inactivated. It has been found that these novel dyes are also useful for selectively killing leukemic cells in bone marrow by photosensitization.

The novel compound has the formula:

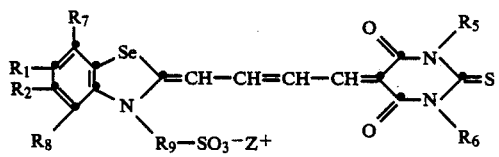

wherein:

$R_1$ and $R_2$ independently are H, alkyl, alkoxy or aryl, and $R_7$ and $R_8$ are H or any of $R_1$ and $R_2$, $R_1$ and $R_7$, $R_2$ and $R_8$ can together comprise the atoms necessary to form a fused aromatic ring on the benzene radical to which they are attached;

$R_5$ and $R_6$ comprise alkyl of from 1-18 carbon atoms provided that the sum of the carbon atoms in $R_5$ and $R_6$ is at least 8;

$R_9$ is an alkylene group of 2-9 nuclear carbon and hetero atoms; and $Z^+$ is a cation.

DESCRIPTION OF THE PREFERRED EMBODIMENTS

The novel compounds useful as anti-viral agents and in the inactivation of leukemia cells have the formula:

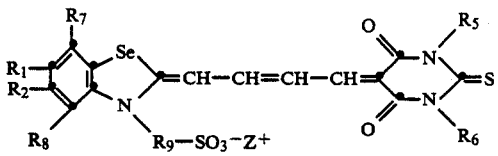

$R_1$ and $R_2$ can each independently comprise H, alkyl of about 1 to 10 carbon atoms such as methyl, ethyl, propyl, butyl, and hexyl, alkoxy, such as methoxy, ethoxy, and the like, wherein the alkyl group contains from 1 to 3 carbon atoms and aryl, such as phenyl, including substituted phenyl, such as tolyl, and the like.

$R_7$ and $R_8$ are H or any pair of $R_7$ and $R_1$, $R_1$ and $R_2$ or $R_2$ and $R_7$ can comprise the atoms necessary to form together with the atoms on the benzene radical to which they are attached, a fused aromatic ring, such as a benzo ring, including substituted benzo, such as a methyl-substituted benzo ring and the like.

$R_5$ and $R_6$ comprise alkyl groups containing from about 1 to about 18 carbon atoms provided that the sum of the carbon atoms in $R_5$ and $R_6$ is at least 8 such as methyl, ethyl, propyl, butyl, heptyl, and including branched and substituted alkyl, such as chloropropyl, methoxymethyl, isopropyl, benzyl, t-butyl, sec-butyl, neopentyl, and the like.

$R_9$ is a straight or branched alkylene group of 2 to 9 nuclear atoms forming the alkylene chain including alkylene chains comprising hetero atoms, or hetero atom-containing groups in the linear alkylene chain or nucleus in the case of branched chains, for example, ethylene, ethylidene, trimethylene, propylene, propylidene, benzylidene, 3-oxo-4-imino-5,5-dimethyl-1,6-hexylene, and the like, preferably $R_9$ is a trimethylene group.

$Z^+$ is any cation such as $Na^+$, $\tfrac{1}{2}Ba^{2+}$, $(C_2H_5)_3NH^+$, $K^+$, $NH_4^+$, and $Li^+$.

Preferred selenium-containing merocyanine dyes have the formula:

Compound 1

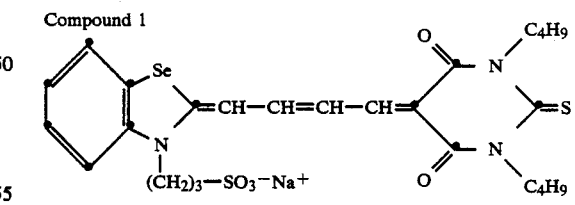

The compounds of the invention can be synthesized by condensation of a 2-methyl-3-sulfoalkylselenazolium hydroxide, inner salt with a 1,3-disubstituted 5-(3-alkoxy-2-propen-1-ylidene)-2-thiobarbituric acid in the presence of a tertiary amine such as triethylamine and a solvent such as acetonitrile or ethanol, with warming or gentle heating to form the ammonium sulfonate salt followed by cation exchange if desired (for example, treatment with sodium iodide to produce the sodium salt of the merocyanine dye or with barium acetate to form the barium salt), and finally treatment with a nonsolvent if necessary to precipitate the dye.

Alternatively, a 5-unsubstituted barbituric acid can be condensed with a 2-[4-(acetanilido)-1,3-butadiene-1-yl]-3-sulfoalkylselenazolium hydroxide, inner salt under similar conditions.

The starting selenazolium hydroxide, inner salt is most conveniently prepared by an addition reaction of a sultone such as propane sultone, butane sultone, etc., to a parent benzoselenazole such as a 2-methylbenzo[d]selenazole.

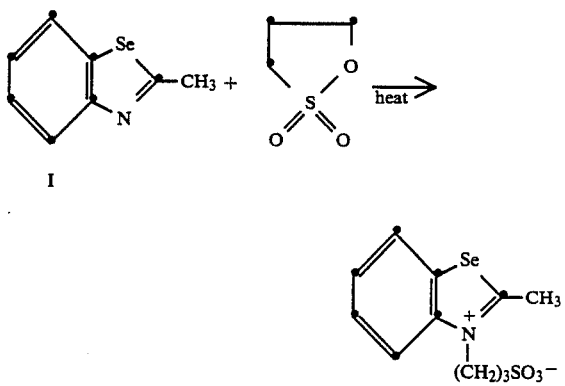

Alternatively, such inner salts can be prepared by an addition reaction between a parent selenazole such as I above and an unsaturated sulfonic acid such as 2-acrylamido-2-methylpropanesulfonic acid as follows:

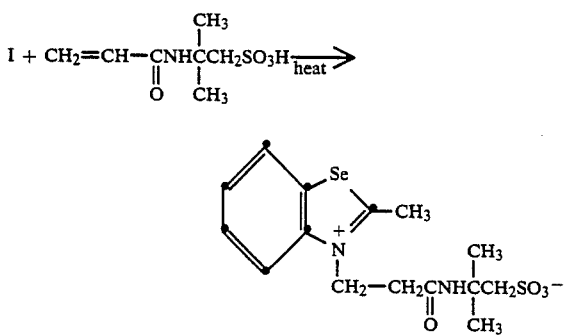

The 1,3-disubstituted-5-(3-alkoxy-2-propen-1-ylidene)-2-thiobarbituric acid derivatives are prepared by the condensation of 1,3,3-trimethoxy-1-propene with the parent 1,3-disubstituted thiobarbituric acid. The product is formed spontaneously as the reactants are mixed in acetone. The disubstituted thiobarbituric acid is obtained by condensation of an N,N'-disubstituted thiourea with diethyl malonate. The N,N'-disubstituted thioureas can be purchased commercially or prepared by conventional alkylation of the nitrogen atoms or thiourea.

The 2-[4-(acetanilido)-1,3-butadien-1-yl]-3-sulfoalkylselenazolium hydroxide, inner salt used in the alternative procedure is prepared by reaction of the parent 2-methylselenazolium hydroxide, inner salt with 1-anilino-3-phenylimino-1-propene hydrochloride available from Aldrich Chemical Co.

These compounds have been found to be useful as agents to destroy or inactivate viruses with the aid of photosensitization. The toxicity of these compounds is relatively low.

The compounds are normally used with light of suitable wavelength in an amount of about 5 to about 25 micrograms per milliliter of product.

The effective wavelengths of visible light that can be used vary greatly depending upon the absorption spectrum of the individual dyes; however, it is generally desired that the light be of a wavelength in the green to orange range. It appears, as expected, that light that is not being absorbed, i.e., blue light and long wavelength red light, is not particularly effective with these compounds.

Tests have shown that:

(1) Suspensions of Friend virus, Friend virus-transformed cells, Herpes simplex, HTLV-I and HTLV-I infected cells are rapidly inactivated by photosensitization with these compounds.

(2) The small amounts of dye that are transferred with the photosensitized products or plasma-serum components are not toxic to mice. The effective amount of some of these compounds is about 100,000 times less than the $LD_{10}$ of the compound in mice.

The ability of these compounds to react with enveloped (i.e., lipid-containing) viruses was tested with the Friend erythroleukemia virus complex, the human T cell leukemia virus, HTLV-I and Herpes simplex 1. Friend virus was obtained from cell-free supernatants of cultured erythroleukemia cells or as a cell-free extract from infected animals. Simultaneous exposure to the compounds (15 ug/ml) and light (40 J/cm$^2$) reduced the virus titer regardless of the origin of the virus preparation. Virus-infected spleen cells, bone marrow cells, and cultured Friend erythroleukemia cells were inactivated at about the same rate as cell-free virus preparations.

HTLV-I was also susceptible to the compound-mediated photosensitization. The amount of virus that could be sedimented by centrifugation was reduced after treatment with the compounds and light. The remainder of the virus were probably lysed. The small fraction that was sedimented was visibly stained by the compound. It is conceivable that the sedimented virus fraction, although not lysed, had sustained enough photodynamic damages to make it noninfectious. For example, when the virus is Herpes simplex 1, the order of magnitude reduction is as high as 45 times.

The demonstrated effectiveness of this method in inactivating Herpes simplex 1 makes it possible to treat herpes lesions by applying or injecting the compound-containing preparations onto or into the lesions.

The ability of the compounds to photosensitize in such low concentrations should make it possible to use the dyes in dermatological products which can be painted on or injected into viral-containing lesions prior to exposure to visible light.

The compound which we have labeled Compound 1 (see structural formula below) reduces illumination times about six-fold in comparison to Merocyanine 540 when used in equimolar concentrations.

Compound 1

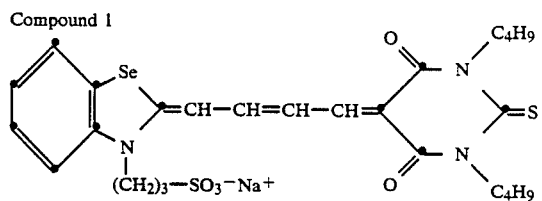

The compound-mediated photolysis of viruses appears to be primarily mediated by singlet oxygen. An additional two-fold reduction in illumination time can therefore be achieved by performing the photosensitization step in the presence of deuterium oxide ($D_2O$).

Unlike heat or high doses of ionizing irradiation, this compound-mediated photolysis is more selective in its toxicity. Dye-mediated photosensitization may be the preferred anti-viral treatment in situations where critical components are temperature- or radiation-sensitive. In addition, the acute systemic toxicity of these dyes is very low. Also, the amount of dye that is injected with a typical mouse bone marrow graft is more than 100,000 times less than the $LD_{10}$ in the same species.

Surprisingly, tests have shown that inactivated viruses retain their antigenic properties. Thus, it should be possible to make vaccines using the viruses inactivated by the method of the present invention.

Representative of the viruses which can be inactivated by the compounds of the present invention are those previously described as well as the viruses which cause human and animal diseases, such as bovine viral diarrhea, and viruses which infect bacterial products, such as the Epstein Barr virus.

More detailed information concerning the anti-viral process of using these compounds with photolysis is found in the previously mentioned Sieber U.S. patent application Ser. No. 933,697.

These novel compounds are also useful in eliminating residual tumor cells from bone marrow grafts by treatment with photolysis. These compounds bind to the lipid portion of the plasma membrane and the photolysis with these compounds is effective against a broad range of leukemias and solid tumors, including drug-resistant tumors. The advantageous use of these compounds is that normal circulating leukocytes and red cells have a low affinity to them and light in the presence of serum appears to have little or no acute cytotoxic effects.

This invention is further illustrated by the following examples.

EXAMPLE 1

Preparation of

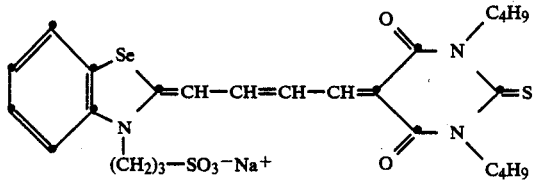

To a reactor was added 1.27 g (4 mmole) of

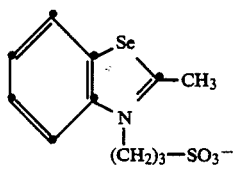

prepared from the parent 2-methylnaphthoxazole and propane sultone in 50 ml of methanol. To this mixture was added 1.29 g (4 mmole)

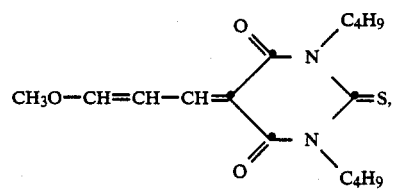

obtained from the condensation of the disubstituted thiobarbituric acid with 1,3,3-trimethoxy-1-propene and 1 ml triethylamine (TEA). The mixture was stirred for 20 minutes, filtered, and 1 g NaI was added to the filtrate and stirred for 30 minutes.

The filtered product recrystallized from methanol had a calculated molecular weight of 632.64, a $\mu$-max of 596 nm in methanol, an extinction coefficient $\epsilon = 16.9 \times 10^4$, and a fluorescence emission maximum at 622 nm. The UV visible spectrum is consistent with the assigned structure and the compound was shown to be pure by both electrophoresis and thin layer chromatography.

EXAMPLE 2

When cultured F4–6 erythroleukemia cells, spleen, or marrow cells from diseased animals, cell-free extracts of cultured cells, spleen cells, or marrow cells, or cell-free supernatants of F-6 cultures were injected into healthy B6D2F1 mice, the spleen weigths increased from about 60–70 mg to about 1500 mg within days. The animals became polycythemic and, eventually, died. When cell suspensions, cell-free extracts, or culture supernatants were photosensitized and exposed to light prior to injection, spleen weights remained normal, hematocrits remained normal, and the animals survived. Normal pluripotent hematopoietic stem cells (as determined by the ability of photosensitized marrow cells to rescue lethally irradiated syngeneic hosts) were spared by the photosensitization treatment. Virus preparations that were exposed to dye or light alone caused splenomegaly, polycythemia, and death. A series of experiments thus showed that the compounds of Examples 1–4 with photolysis inactivates free Friend virus, intracellular Friend virus, and Friend virus-infected cells.

The result of the experiments with treated and untreated mice with (30 minutes at 70 Watts/m$^2$) and without (ambient daylight only) light treatment are shown in spleen weights in Table I below.

TABLE I

| Compound | Light | Spleen Weight (mg) |
| --- | --- | --- |
| Normal Spleen (no virus) | | 59.6 |
| Spleen With Virus (no compound) | Daylight | 1460 |
| Example 1 | Daylight | 1372 |
| Example 1 | 70 Watts/m$^2$ for 30 minutes | 68.2 |

It can be seen from the above data that light treatment with the compounds of this invention effectively inactivated the virus cells as evidenced by the resulting spleen weight after treatment.

It will be readily understood by those skilled in the art that the foregoing description has been for purposes of illustration only and that a number of changes may be made without departing from the scope of the inven-

What is claimed is:

1. A compound having the following formula:

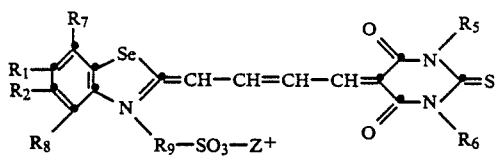

wherein:

$R_1$ and $R_2$ independently are H, alkyl, alkoxy, or carbocyclic aryl, $R^7$ and $R^8$ are H or any of $R_1$ and $R_2$, $R_1$ and $R_7$, and $R_2$ and $R_8$ can together comprise the atoms necessary to form a fused 6-membered carbocyclic aromatic ring on the benzene radical to which they are attached;

$R_5$ and $R_6$ are independently selected from among the group consisting of alkyl and benzyl of from 1-18 carbon atoms provided that the sum of the carbon atoms in $R_5$ and $R_6$ is at least 8;

$R_9$ is an alkylene group of 2-9 nuclear carbon atoms and CONH-groups; and $Z^+$ is a pharmaceutically acceptable cation.

2. The compound of claim 1 wherein $R_5$ and $R_6$ are benzyl, butyl, or heptyl.

3. The compound of claim 1 wherein $R_9$ is trimethylene.

4. The compound of claim 1 wherein $Z^+$ is selected from the group consisting of $Na^+$, $\frac{1}{2}Ba^{2+}$ and $(C_2H_5)_3N^+H$.

5. The compound of claim 1 wherein one of $R_7$ and $R_1$, $R_1$ and $R_2$ or $R_2$ and $R_8$ together comprise the atoms necessary to form a fused 6-membered carbocyclic aromatic ring on the benzene ring to which they are attached.

6. A compound having the formula:

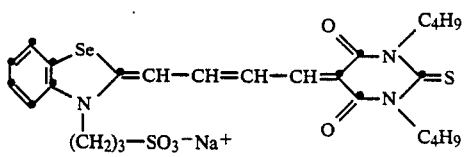

* * * * *